United States Patent Office 3,470,790
Patented Oct. 7, 1969

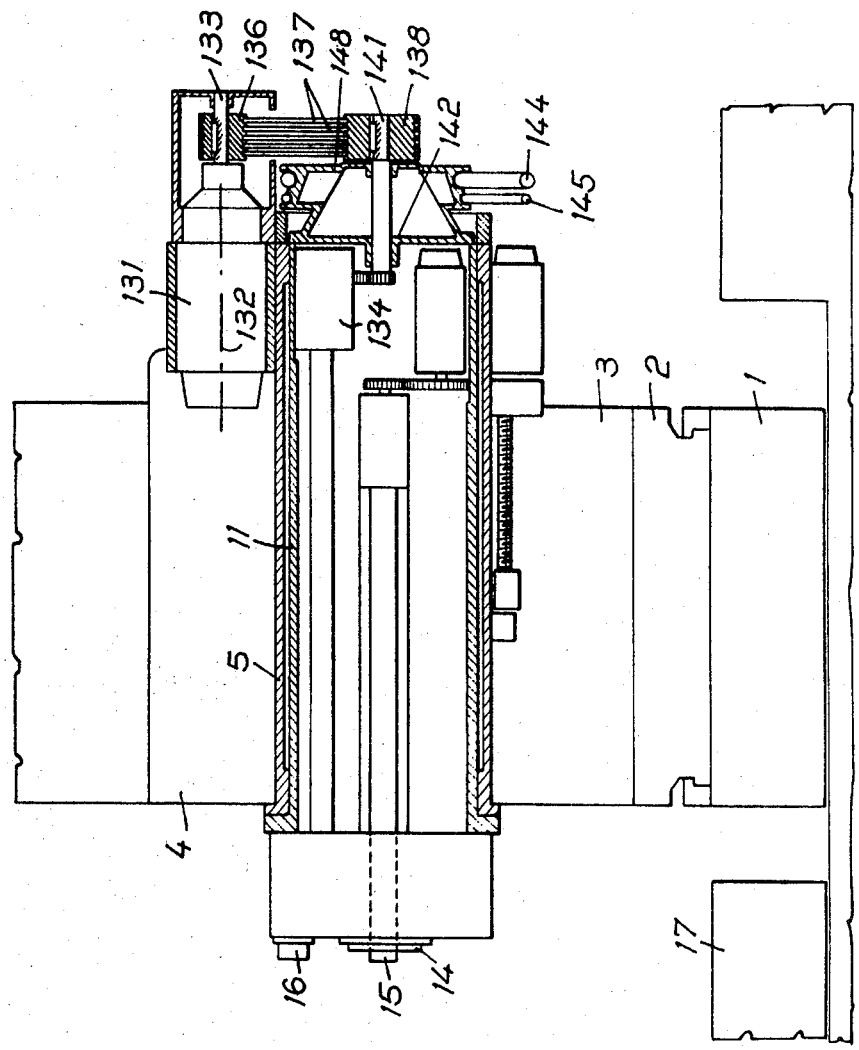

3,470,790
MILLING AND BORING MACHINES WITH ROTARY TAILSTOCKS

René Deflandre, Paris, France, assignor, by mesne assignments, to Charles William Berthiez, Lausanne, Switzerland
Filed Feb. 28, 1967, Ser. No. 619,401
Claims priority, application France, Mar. 11, 1966, 53,209
Int. Cl. B23c 1/00, 3/00, 7/00
U.S. Cl. 90—14                     2 Claims

ABSTRACT OF THE DISCLOSURE

Milling and boring machine, comprising a headstock movable on an upright, wherein that part of said headstock containing all the control members necessary for a conventional spindle of a milling and boring machine is in the form of a cylindrical body mounted for rotational movement within a support, about an axis coaxial with the axis of the above mentioned spindle, the electric control motor for rotating and axially moving the spindles mounted in the cylindrical body being disposed externally thereof on the support in which the latter is mounted.

---

The present invention relates to milling and boring machines, particularly the horizontal milling and boring machines of the type described in my co-pending application Ser. No. 502,935 filed Oct. 23, 1965, now Patent No. 3,386,146, dated June 4, 1968, i.e. comprising a headstock movable on an upright which itself is movable over a bed, which are characterised in that the part of the headstock which contains all the control members necessary for a conventional milling-boring spindle, in particular the horizontal spindle of a horizontal milling and boring machine, is made in the form of a cylindrical body mounted so as to be rotatable within a headstock support about an axis coaxial with the axis of the above mentioned spindle.

In my co-pending application Ser. No. 502,935 filed Oct. 23, 1965, embodiments have been described in which the cylindrical body contains the boring spindles, as well as the means for rotating and moving them axially, including the electrical control motors, but it has also been indicated that one part of these means—the electrical motors and their gear boxes for example—could also be located on the headstock support by connecting them with the members located on the cylindrical body by a suitable driving means.

The present invention consists in a horizontal milling and boring machine as claimed in my co-pending application Ser. No. 502,935 filed Oct. 23, 1965 wherein the electric control motor for rotating the spindles mounted in the cylindrical body is disposed externally thereof, on the support in which the latter is mounted.

In a particular embodiment, the motor driving the machining spindles is arranged so that its axis is parallel to that of the cylindrical body and it is connected to the gear box located therewithin by means of a shaft mounted in the corresponding end of said body, and coaxially thereto, said shaft carrying a pulley over which one or more belts pass and they also pass over a pulley mounted on the motor shaft.

In order that the invention may be more readily understood reference will now be made to the accompanying drawing, which shows, in section, one embodiment of the invention, by way of example.

The milling and boring machine shown in the drawing comprises, like those shown in the main patent, conventional parts, such as the bed 1 over which the base 2 is horizontally movable, and to which base the upright 3 is bolted. A slide 4 is displacable vertically on the latter. A headstock support 5 can slide on the slideblock and the cylindrical body 11 can rotate inside this support coaxially to the milling spindles 14 and boring spindles 15. In the use of the presently described machine, the milling, boring, drilling and screw-thread cutting tools are carried by these spindles, or even by a supplementary high speed spindle 16, the part to be machined being clamped to the bed plate 17. The essential feature of the embodiment shown in this drawing resides in the fact that an electric motor 131 which serves to rotate the machining spindles mounted in the cylindrical body 11, is arranged on the headstock support 5, externally thereof and consequently externally of the cylindrical body 11. It is arranged so that its axis 132 is parallel to the axis of the cylindrical body 11. The motor shaft 133 is connected to a gear box 134, from which are driven the spindles, and which is mounted inside the cylindrical body 11, by a driving means which comprises a multi-grooved pulley 136 fixed to the end of the shaft 133 of the electric motor 131, trapezoidal belts 137 which pass over this pulley, and another multi-grooved pulley 138 over which the belts 137 also pass. The pulley 138 is fixed to the outer end of an intermediate shaft 141 mounted to rotate about the axis of the cylindrical body 11, in supports 142 fixed to the corresponding end 148 of said cylindrical body.

Under these conditions, whatever may be the angular position of the cylindrical body 11 in the headstock support 5, the transmission of the movement between the electric motor 131 for driving the spindles and the gear box 134 is always effected correctly.

By way of indication, the electrical and hydraulic connections for the members located in the cylindrical body 11 have been indicated at 144 and at 145 respectively, and are supported in pulley grooves provided on the end 148 of the cylindrical body 11.

Of course, the invention is not limited to the embodiment described and shown.

For example, in order to connect the electric motor, which is situated outside the rotating cylindrical body, to the gear box mounted inside the latter, any driving means other than the belt means shown in the drawing could be used. Thus it is for example that use could be made for gearing comprising for example conical pinions and/or one or more endless worms. In this case, it might then be possible to arrange the electric motor in a different position from that herein shown. The gear boxes could also be mounted, like the motor, externally of the rotating body.

What is claimed is:

1. A milling and boring machine comprising an upright, a headstock support vertically movable on said upright, a cylindrical body rotatably mounted within said support, a tool-carrying spindle rotatably mounted in said cylindrical body coaxially to said cylindrical body, a motor for rotating said spindle mounted exteriorly of said cylindrical body and on said headstock support within which the cylindrical body is rotatably mounted, and means drivingly connecting said motor to said spindle.

2. A machine as claimed in claim 1 wherein the motor for driving the spindle is arranged so that its axis is parallel to that of the cylindrical body and such spindle and in which said connecting means comprises a shaft mounted in said cylindrical body for rotatable movement about an axis coaxial with the axis of said cylindrical body, driven means connecting the shaft of said motor to said interior shaft, and driven means connecting said interior shaft to said spindle.

References Cited

UNITED STATES PATENTS

| 2,196,231 | 4/1940 | Ridgway | 77—3 XR |
|---|---|---|---|
| 2,685,122 | 8/1954 | Berthiez. | |
| 3,237,486 | 3/1966 | Gilbert et al. | |
| 3,251,272 | 5/1966 | Deflandre | 90—11 |
| 3,290,965 | 12/1966 | Gaev et al. | 77—3 |

LEONIDAS VLACHOS, Primary Examiner

U.S. Cl. X.R.

29—26; 90—11